Nov. 18, 1969 F. C. HAZZARD 3,479,616
DIFFERENTIAL MODULATOR
Filed Aug. 1, 1966
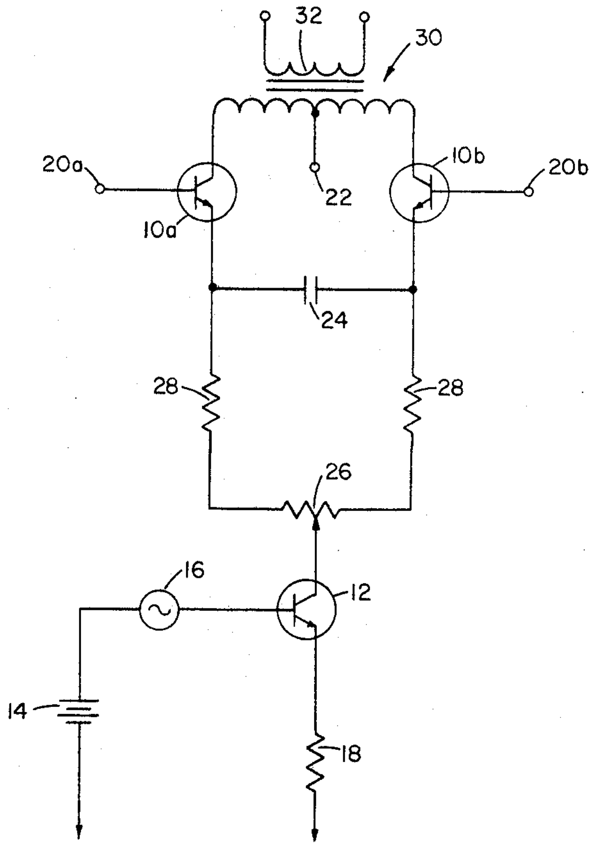
Frank C. Hazzard,
INVENTOR.
Harry M. Saragovitz
BY Edward J. Kelly
Herbert Berl
Alfred E. Smith United States Patent Office 3,479,616
Patented Nov. 18, 1969

3,479,616
DIFFERENTIAL MODULATOR

Frank C. Hazzard, Orlando, Fla., assignor, by mesne assignments, to the United States of America as represented by the Secretary of the Army Filed Aug. 1, 1966, Ser. No. 569,529
Int. Cl. H03c *1/54*
U.S. Cl. 332—43 4 Claims

ABSTRACT OF THE DISCLOSURE

A device for providing an A.C. signal whose amplitude is proportional to the difference between two D.C. signals. An A.C. modulating signal is applied to the base of a transistor connected as an amplifier, the output thereof being fed through a balance network to each of two transistors connected as amplifiers, their outputs being compared by a transformer with two primary windings connected in series opposition. The output of the first amplifier splits between each of the two second mentioned amplifiers, the amount of current through each being determined by the D.C. bias applied to the bases thereof.

This invention relates to modulators and particularly relates to differential modulators which provide an A.C. signal whose amplitude is proportional to a modulating signal and a D.C. differential control signal.

It is an object of this invention to provide a differential modulator which provides a phase reversal A.C. signal that is proportional to a D.C. signal (in particular a differential signal) and whose phase is shifted 180 degrees with reversal of D.C. signal polarity.

It is another object of this invention to provide a differential modulator in which sizeable gain is possible in the D.C. to A.C. transformation.

It is still another object of this invention to provide a differential modulator which excels in accuracy and linearity.

The desired results of the present invention are obtained by applying an A.C. modulating signal to the base of a transistor connected as an amplifier, the output thereof being fed through a balance network to each of two transistors connected as amplifiers, their outputs being compared by a transformer which has two primary windings connected in series opposition. The output of the first amplifier splits between each of the two second mentioned amplifiers, the amount of current through each being determined by the D.C. bias applied to the bases thereof.

For a better understanding of the invention, its advantages, and specific objects, reference should be had to the accompanying drawing in which the single figure is a schematic diagram of the present invention.

Referring now to the drawing, the differential modulator comprises an A.C. modulating signal source 16 connected to the base of a transistor 12. The collector of transistor 12 is connected to a potentiometer 26 which provides a balance adjustment between two current paths. A pair of transistors 10*a* and 10*b* are connected in a differential configuration with their emitters connected through resistors 28 to potentiometer 26. A transformer 30 is provided with a pair of primary windings connected in series opposition between the collectors of transistors 10*a* and 10*b* and an output winding 32. The bases of transistors 10*a* and 10*b* are connected to terminals 20*a* and 20*b*, respectively, for receiving a D.C. differential control voltage.

The emitters of transistors 10*a* and 10*b* are current fed by transistor 12 with the total current determined by D.C. bias source 14, A.C. modulation signal source 16, and emitter resistor 18. The division of the A.C. current originating with the modulating signal from source 16 divides in the same proportoin as the D.C. currents, since the impedance of transistors 10*a* and 10*b* is determined by the D.C. operating parameters. The capacitor 24 prevents A.C. modulation of the transistors 10*a* and 10*b* so that they act solely as two impedances controlled by D.C. parameters for controlling the split of the A.C. component or modulating current. The split currents are compared by transformer 30 which has two primary windings connected in series opposition. Output winding 32 has an A.C. output proportional to the difference of the currents flowing through transistors 10*a* and 10*b* and is, therefore, proportional to the D.C. control voltage applied between terminals 20*a*, 20*b*, and 22, and whose phase changes 180 degrees with a change of D.C. polarity between terminals 20*a*, 20*b*, and 22. The transfer function (D.C. signal to A.C. output) is very precise and exhibits excellent linearity over a large dynamic output range when the control signal is restrained to small signals.

While the invention has been described with reference to a preferred embodiment thereof, it will be apparent that various modifications and other embodiments thereof will occur to those skilled in the art within the scope of the invention.

What I claim is:

1. A differential modulator for providing a phase reversal A.C. signal that is proportional to a D.C. signal comprising: an A.C. modulating signal means; current dividing means for dividing said modulating signal into two paths; a D.C. differential control voltage connected to said dividing means for proportionally controlling said current division; and means for comparing said divided currents and providing an A.C. output proportional to the differences of the currents flowing through said two paths, said A.C. modulating signal means comprising an A.C. modulating signal source having an input and an output; a D.C. biasing voltage source having a first and second output, said first output being connected to the input of said A.C. modulating signal source; a first transistor having a base, emitter, and collector; said modulating signal source output being connected to the base of said transistor; resistive means connecting the emitter of said transistor to the second output of said D.C. biasing voltage source; and the collector of said transistor being connected to said current dividing means.

2. A differential modulator as set forth in claim 1 wherein said current dividing means includes a second and third transistor each having a base, emitter, and a collector; said means for comparing connected between said collectors; and resistive means connecting said emitters to the collector of said first transistor.

3. A differential modulator as set forth in claim 2 wherein said comparing means is a transformer having a plurality of primary windings and secondary winding; said primary windings being connected between said collectors in phase opposition causing the difference of their currents to be felt in said secondary winding.

4. A differential modulator as set forth in claim 3 wherein said D.C. differential control voltage is connected to said bases of said second and third transistors.

References Cited

UNITED STATES PATENTS

| | | | |
|---|---|---|---|
| 2,473,457 | 6/1949 | Tyson | 328—146 |
| 2,562,006 | 7/1951 | Wheeler | 332—43 |

FOREIGN PATENTS

| | | |
|---|---|---|
| 822,924 | 11/1959 | Great Britain. |

ROY LAKE, Primary Examiner

JAMES B. MULLINS, Jr., Assistant Examiner

U.S. Cl. X.R.

307—262